Jan. 23, 1945.  H. F. ETTINGER  2,367,855
APPARATUS FOR DETERMINING REFRACTIVE ERRORS OF THE EYE
Filed Dec. 5, 1942
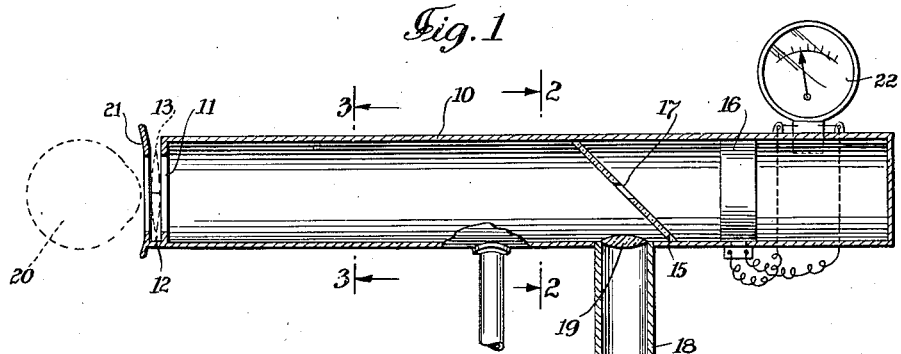
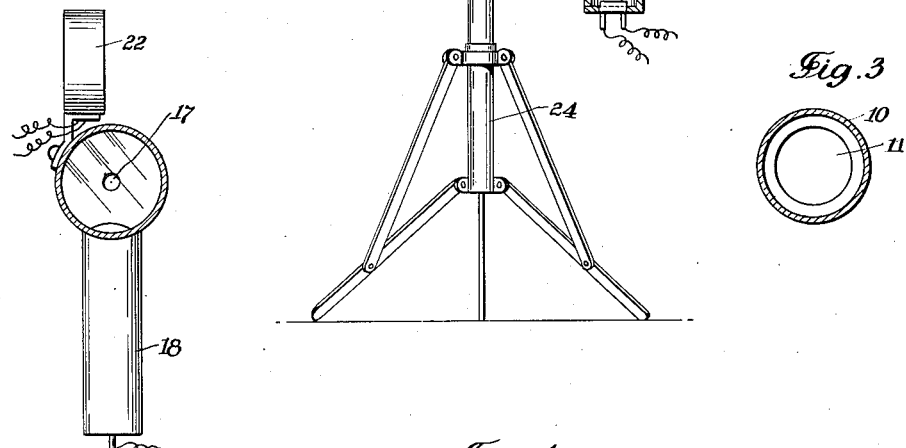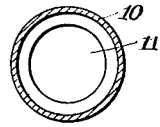
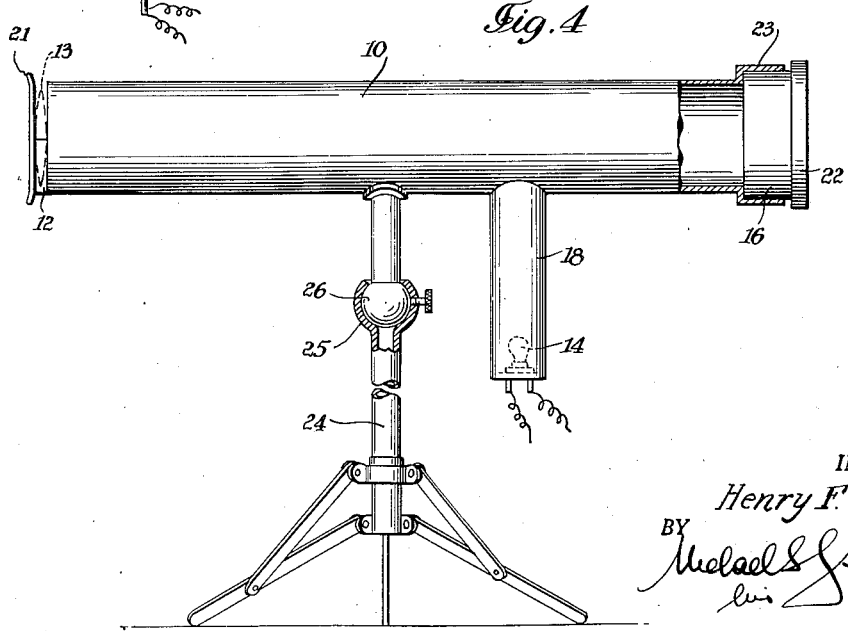
INVENTOR:
Henry F. Ettinger Patented Jan. 23, 1945

2,367,855

UNITED STATES PATENT OFFICE 2,367,855

APPARATUS FOR DETERMINING REFRACTIVE ERRORS OF THE EYE

Hermann F. Ettinger, Redwood, N. Y.; now by judicial change of name Henry Franklin Ettinger Application December 5, 1942, Serial No. 467,917

8 Claims. (Cl. 88—20)

My present invention relates to apparatus for determining refractive errors of the eye.

Methods of determining refractive errors were up to now based upon subjective observation of either the patient himself or of the person examining the eye.

The basic principle of determination of the refractive errors by the patient himself consists in putting various lenses or lens combinations in front of the eye in question and having the patient determine which of these lenses best corrects the refractive error of his eye. This method is certainly not accurate and depends entirely on the patient's gift of observation.

The basic principle of determination of the refractive errors by the person examining the eye is the scientific fact that the illumination caused by a beam of light reflected by the retina of the patient's eye will seem to move across the patient's pupil if the direction of the light beam is changed. The character of this movement will then determine the character of the refractive error of the eye. However, also this observation is dependent on the ability of the observing person which ability can only be obtained by long study and practice.

Both of these methods are dependent on personal abilities, namely on the ability of either the patient himself or the person examining the eye.

It is, therefore, the main object of my present invention to provide an apparatus which makes above described methods unnecessary and which enables determination of refractive errors of the eye independent of personal skill, i. e. independent of the personal abilities of the patient as well as of the person examining him.

It is a further object of my present invention to provide an apparatus for determining refractive errors which enables objective determination of the refractive errors of the eye being examined, i. e. which indicates such refractive errors independently from the personal abilities of the examining person.

It is still a further object of my present invention to provide means by which it is possible to determine objectively the lens or lens combination to be used for correcting refractive errors of the examined eye.

It is another object of my present invention to provide a new apparatus for determining refractive errors of the eye which can be handled easily by anybody without the necessity of any practice and special skill.

It is still another object of this invention to provide a new apparatus which enables simultaneously objective indication of the refractive error of the eye and subjective retinoscopic observation of the eye if the person examining the eye desires to do so.

With the above objects in view, my present invention mainly consists in a new apparatus for determining refractive errors of the eye by illuminating the retaina of the eye to be examined under different optical conditions adapted to influence optical refraction of an eye and measuring the retinal illumination of the eye under these different optical conditions. This new apparatus is based on the scientific fact that if the retina of an eye having a refractive error is illuminated by a light beam and various lenses placed in the path of said light beam in the front of the eye, the retinal illumination is brightest when a lens entirely correcting the refractive error of the examined eye is placed in front of it; this illumination decreases from this maximal brightness in accordance with the difference between the optimal lens fully correcting the refractive error and the lens actually placed before the patient's eye. This means that if two different lenses are placed before the patient's eye and the retinal illumination is measured, that lens with which the retinal illumination is brighter, better corrects the refractive error of this eye.

Thus, if in accordance with my present invention the retinal illumination of the eye is measured under different optical conditions and the light intensities of illumination obtained are compared with each other, it can easily be determined which of these illuminations is the brightest and which optical conditions correspond to this maximal brightness. These optical conditions, i. e. that lens or lens combination placed before the eye during this maximal illumination, will be indicative of ahe refractive error of the examined eye.

My new apparatus is used for determination of refractive errors by consecutively placing a series of various refraction correcting lenses in front of the eye to be examined, illuminating the retina of said eye through each of these lenses, and measuring the illumination of the retina each time another of the lenses is placed in front of the eye, thus determining the maximal illumination of the retina and the lens through which this maximal illumination is obtained; this lens will then be characteristic and indicative for the refractive error of the examined eye.

A preferred embodiment of my present invention comprises means for illuminating the retina of an eye, light-measuring means for measuring the illumination of this retina and means for exchangeably holding different refraction correcting lenses in front of the eye being examined. In view of the fact that it is important that during all comparative measurements the relation between illuminating means, light measuring means, and lens holding means be constant, I provide a common support for all these parts holding all of them permanently at fixed distances from each other.

Naturally, it is advantageous to provide also a support for the head of the patient, the eye of which is examined in order to avoid movement of the patient's eye during examination. Preferably, this support is rigidly connected with the support of the apparatus itself, forming part of the same, thereby establishing fixed spatial relation during the entire examination.

The novel features which I consider characteristic for my invention are set forth in particular in the appended claims. The invention itself, however, both as to its construction and its method of operation, together with additional objects and advantages thereof, will be best understood from the following description of specific embodiments, when read in connection with the accompanying drawing, in which:

Figure 1 is a longitudinal section through my new apparatus;

Figure 2 is a cross section of the apparatus shown in Figure 1 along line 2—2 seen in direction of arrow 2;

Figure 3 is a cross section along line 3—3, seen in direction of arrow 3; and

Figure 4 shows a modified embodiment of my apparatus, partly in side view and partly in longitudinal section.

As shown in the drawing, my new apparatus consists of a cylindrical housing 10 closed on all sides, an opening 11 at the front end of this cylindrical housing 10, guiding means 12 for supporting consecutively various correcting refraction lenses 13 within opening 11, a light source 14, light deflecting means, e. g. a light deflecting mirror 15, and light measuring means, i. e. photoelectric cell 16.

The photo-electric cell is arranged substantially at the rear end of the cylindrical housing 10 behind mirror 15. This mirror is provided with a small central hole 17 and arranged at an angle of 45° to the longitudinal axis of the cylindrical housing 10.

Light source 14 which is arranged in a separate small tube 18 emits a light beam which is directed by condenser lens 19 normal to the direction of the longitudinal axis of the cylindrical housing 10 upon mirror 15 which reflects it through front opening 11 and the correcting lens 13 placed into this opening into the pupil of the patient's eye 20, indicated in the drawing in dotted lines. The front face of the lens 13 and rim 21 around this lens which rim may be cup shaped, serve for supporting the patient's eye during examination.

The light intensity of the illumination of the patient's retina is then measured by photo-electric cell 16 and the various degrees of intensity obtained by changing the correcting lenses 13 then indicated on the indicating meter 22. Hole 17 in mirror 15 is provided for the purpose of making it possible to measure the illumination of the patient's retina by means of the photo-electric cell 16.

In Figure 4, I have shown a modified embodiment of my present invention, namely an embodiment which enables not only objective measurement of the illumination of the retina but also subjective observation of the patient's retina if the person examining the eye so desires. For this purpose, I propose, as shown in Figure 4, to arrange the photo-electric cell 16 in an easily removable manner, i. e. slidable within the wider rear part 23 of the cylindrical housing 10; when cell 16 is removed, the rear end of the cylindrical housing 10 is open, enabling visual observation of the retina by the person examining the eye.

As during such visual retinoscopic observation it might be necessary to vary the direction of the light beam directed against the patient's eye, I provide between housing 10 and support 24 holding this housing, connecting means enabling shifting of the housing in two directions normal to each other, when required. These connecting means may consist, as shown in Figure 4, of two rotatable bearing members 25 and 26 arranged normal to each other.

It will be understood that each of the elements described above, or two or more together, may also find a useful application in other types of eye-examining apparatus differing from the types described above.

While I have illustrated and described the invention as embodied in apparatus for determining refractive errors of the eye, I do not intend to be limited to the details shown, since various modifications and structural changes may be made without departing in any way from the spirit of my invention.

Without further analysis, the foregoing will so fully reveal the gist of my invention that others can, by applying current knowledge, readily adapt it for various applications without omitting features that, from the standpoint of prior art, fairly constitute essential characteristics of the generic or specific aspects of this invention and therefore such adaptations should and are intended to be comprehended within the meaning and range of equivalence of the following claims.

What I claim as new and desire to secure by Letters Patent is:

1. In an apparatus for determining the refractive error of the eye, a closed cylindrical housing, an opening at the front end of said cylindrical housing, means for supporting consecutively various refraction correcting lenses within said opening in front of said eye, an additional opening in the cylindrical wall of said housing, a light source directing a light beam having permanently equal and constant light intensity and position through said additional opening into said housing, a light deflecting mirror arranged in said cylindrical housing within the path of said light beam and deflecting the same with unchanged light intensity through said opening at the front end of said housing so that said light beam is impinging with permanently equal light intensity upon said various refraction correcting lenses held by said supporting means within said opening in front of said eye, said light deflecting mirror being provided with a central hole, and light intensity measuring and indicating means within said cylindrical housing arranged behind said hole substantially at the rear end of said housing opposite said opening at the front end of said housing in such a manner as to be adapted to measure the intensity of the light reflected by said retina of said tested eye positioned immediately in front of said opening outside of said closed housing during consecutive illuminations of the same by said illuminating means through said various refraction correcting lenses held by said supporting means within said opening in front of said tested eye, said light intensity measuring and indicating means thus enabling determination of the maximal light intensity of the light reflected by said tested eye during consecutive illuminations through said refraction correcting lenses and determination of that lens through which said maximal light intensity of light reflected by said tested eye is obtained, said lens being characteristic and indicative for the specific refractive error of said tested eye.

2. In an apparatus for determining the refractive error of the eye, a closed cylindrical housing, an opening at the front end of said cylindrical housing, means movably supporting a series of refraction correcting lenses in such a manner as to move them consecutively in front of said opening at the front end of said housing in front of said eye, a light-source within said cylindrical housing emitting a light beam having permanently equal and constant light intensity and position through said opening so that said light beam is impinging with permanently equal and constant light intensity upon said various refraction correcting lenses held by said supporting means within said opening in front of said eye, and light intensity measuring and indicating means within said housing arranged substantially at the rear end of the same, opposite said opening in such a manner as to be adapted to measure the intensity of the light reflected by said retina of said tested eye positioned immediately in front of said opening outside of said closed housing during consecutive illuminations of the same by said illuminating means through said various refraction correcting lenses held by said supporting means within said opening in front of said tested eye, said light intensity measuring and indicating means thus enabling determination of the maximal light intensity of the light reflected by said tested eye during consecutive illuminations through said refraction correcting lenses and determination of that lens through which said maximal light intensity of light reflected by said tested eye is obtained, said lens being characteristic and indicative for the specific refractive error of said tested eye.

3. In an apparatus for determining the refractive error of the eye, a closed cylindrical housing, an opening at the front end of said cylindrical housing, means movably supporting a series of refraction correcting lenses in such a manner as to move them consecutively in front of said opening at the front end of said cylindrical housing in front of said eye, an additional opening in the cylindrical wall of said housing, a light source directing a light beam having permanently equal and constant light intensity and position through said additional opening into said housing normal to the longitudinal axis of said housing crossing the same, a light deflecting mirror arranged within said cylindrical housing at an angle of 45° to the longitudinal axis of said housing within the path of said light beam, deflecting the same with unchanged light intensity through said opening at the front end of said cylindrical housing so that said light beam is impinging with permanently equal light intensity upon said various refraction correcting lenses held by said supporting means within said opening in front of said eye, said light deflecting mirror being provided with a central hole, a photo-electric cell arranged within said cylindrical housing behind said hole, facing the same with its light-sensitive face in such a manner as to be adapted to measure the intensity of the light reflected by the retina of said eye positioned immediately in front of said opening outside of said closed housing during consecutive illuminations of the same by said illuminating means through said various refraction correcting lenses held by said supporting means within said opening in front of said eye, and indicating means outside said cylindrical housing connected with said photo-electric cell and adapted to indicate the intensity of light reaching through said hole the light-sensitive face of said photo-electric cell thus enabling determination of the maximal light intensity of the light reflected by said tested eye during consecutive illuminations through said refraction correcting lenses and determination of that lens through which said maximal light intensity of light reflected by said tested eye is obtained, said lens being characteristic and indicative for the specific refractive error of said tested eye.

4. In an apparatus for determining the refractive error of the eye, a closed cylindrical housing, an opening at the front end of said cylindrical housing, means for supporting consecutively various refraction correcting lenses within said opening in front of said eye, an additional opening in the cylindrical wall of said housing, a light source directing a light beam through said additional opening into said housing, a light deflecting mirror arranged in said cylindrical housing within the path of said light beam and deflecting the same through said opening at the front end of said housing, said light deflecting mirror being provided with a central hole, and light intensity measuring and indicating means arranged in easily removable manner within said cylindrical housing behind said hole in said mirror, substantially at the rear end of said cylindrical housing and opposite said opening at the front end of the same in such a manner as to be adapted to measure the intensity of the light reflected by said retina of said tested eye positioned immediately in front of said opening outside of said closed housing during consecutive illuminations of the same by said illuminating means through said various refraction correcting lenses held by said supporting means within said opening in front of said tested eye, said light measuring means thus enabling determination of the maximal light intensity of the light reflected by said tested eye during consecutive illuminations through said refraction correcting lenses and determination of that lens through which said maximal light intensity of light reflected by said tested eye is obtained, said lens being characteristic and indicative for the specific refractive error of said tested eye, said light intensity measuring means being arranged in such a manner as to leave when removed an opening at the rear end of said housing for visual observation of the retina of the eye the refractive error of which has to be determined.

5. Apparatus for determining refractive errors of an eye comprising holding means for consecutively holding different refraction correcting lenses in front of the tested eye, means for illuminating the retina of said tested eye including a light source emitting a light beam having a permanently equal and constant position and light intensity directed through said different refraction correcting lenses held by said holding means in front of said tested eye, and means for measuring the intensity of the light reflected by said retina during consecutive illuminations of the same by said illuminating means through said different refraction correcting lenses held by said holding means in front of said tested eye, thus enabling determination of the maximal light intensity of the light reflected by said tested eye during consecutive illuminations through said refraction correcting lenses and determination of that lens through which said maximal light intensity of light reflected by said tested eye is obtained, said lens being characteristic and indicative for the specific refractive error of said tested eye.

6. Apparatus for determining refractive errors of the eye comprising a housing closed by walls on all sides, an opening in one of said walls, holding means for consecutively supporting various refraction correcting lenses within said opening in front of a tested eye, a light source within said housing emitting a stationary light beam with equal light intensity through said opening and illuminating the retina of said tested eye consecutively through said various refraction correcting lenses held by said supporting means within said opening in front of said tested eye, and light intensity measuring means arranged within said housing in such a manner as to be adapted to measure the intensity of the light reflected by said retina of said tested eye positioned immediately in front of said opening outside of said closed housing during consecutive illuminations of the same by said illuminating light beam through said various refraction correcting lenses held by said supporting means within said opening in front of said tested eye, said light measuring means thus enabling determination of the maximal light intensity of the light reflected by said tested eye during consecutive illuminations through said refraction correcting lenses and determination of that lens through which said maximal light intensity of light reflected by said tested eye is obtained, said lens being characteristic and indicative for the specific refractive error of said tested eye.

7. Apparatus for determining refractive errors of the eye comprising a housing closed by walls on all sides, an opening in one of said walls, holding means for consecutively supporting various refraction correcting lenses within said opening in front of a tested eye, a light source within said housing emitting a stationary light beam with equal light intensity, a light deflecting means arranged within said housing in such a manner as to direct said light beam emitted by said light source with unchanged light intensity through said opening so as to illuminate stationarily and with equal light intensity the retina of said tested eye consecutively through said various refraction correcting lenses held by said supporting means within said opening in front of said tested eye, and light intensity measuring means arranged within said housing in such a manner as to be adapted to measure the intensity of the light reflected by said retina of said tested eye positioned immediately in front of said opening outside of said closed housing during consecutive illuminations of the same by said illuminating light beam through said various refraction correcting lenses held by said supporting means within said opening in front of said tested eye, said light intensity measuring means thus enabling determination of the maximal light intensity of the light reflected by said tested eye during consecutive illuminations through said refraction correcting lenses and determination of that lens through which said maximal light intensity of light reflected by said tested eye is obtained, said lens being characteristic and indicative for the specific refractive error of said tested eye.

8. Apparatus for determining refractive errors of the eye comprising a closed cylindrical housing, an opening at the front end of said cylindrical housing, means for supporting consecutively various refraction correcting lenses within said opening in front of the tested eye, an additional opening in the cylindrical wall of said housing, a light source directing a light beam stationarily and with equal light intensity through said additional opening into said cylindrical housing, a light deflecting mirror arranged in said cylindrical housing within the path of said light beam and deflecting the same with unchanged light intensity through said opening at the front end of said housing and illuminating the retina of said eye consecutively through said various refraction correcting lenses held by said supporting means within said opening in front of said eye, and light intensity measuring means within said housing arranged substantially at the rear end of the same opposite said opening in such a manner as to be adapted to measure the intensity of the light reflected by said retina of said tested eye positioned immediately in front of said opening outside of said closed housing during consecutive illuminations of the same by said illuminating light beam through said various refraction correcting lenses held by said supporting means within said opening in front of said tested eye, said light intensity measuring means thus enabling determination of the maximal light intensity of the light reflected by said tested eye during consecutive illuminations through said refraction correcting lenses and determination of that lens through which said maximal light intensity of light reflected by said tested eye is obtained, said lens being characteristic and indicative for the specific refractive error of said tested eye.

HERMANN F. ETTINGER.